W. STIRK.
Corn Planter.

No. 100,815.  Patented March 15, 1870.

Attest:
H. T. Willson,
A. Joollars.

Inventor,
William Stirk

W. STIRK.
Corn Planter.
No. 100,815. Patented March 15, 1870.
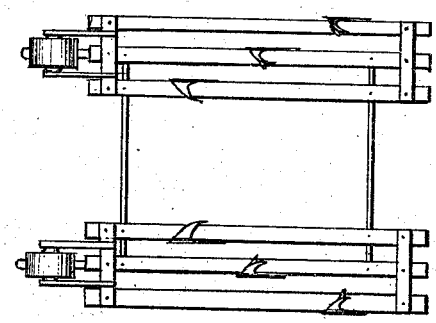
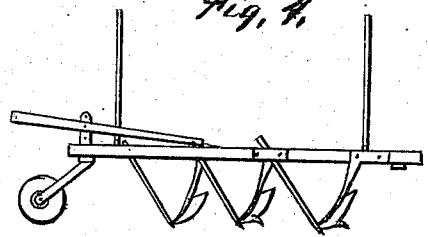

United States Patent Office.

WILLIAM STIRK, OF FORT WAYNE, INDIANA.

Letters Patent No. 100,815, dated March 15, 1870.

IMPROVEMENT IN COMBINED CORN-MARKER, PLANTER, AND CULTIVATOR.

The Schedule referred to in these Letters Patent and making part of the same.

To all whom it may concern:

Be it known that I, WILLIAM STIRK, of Fort Wayne, in the county of Allen, and State of Indiana, have invented certain new and useful Improvements in Corn-Markers, Planters, and Cultivators; and I do hereby declare that the following is a full and exact description thereof, reference being had to the accompanying drawings and to the letters of reference marked thereon, in which like letters refer to like parts in the different figures.

To enable others skilled in the arts to make and use my invention, I will proceed to describe its construction and operation.

In the drawings—

Figure 3 represents an inverted plan view of the cultivator-attachment, detached.

The nature of my invention consists in the construction of an apparatus that will plant corn in check row, which may be easily and readily changed into a corn cultivator capable of operating upon each side of a row of corn at the same time.

My invention consists, particularly, in the device by which the grain is deposited in the earth at equal intervals, as will be hereinafter fully described.

Also, to the method of attaching the cultivator to the carriage which supports the seeding-apparatus.

Figure 1:
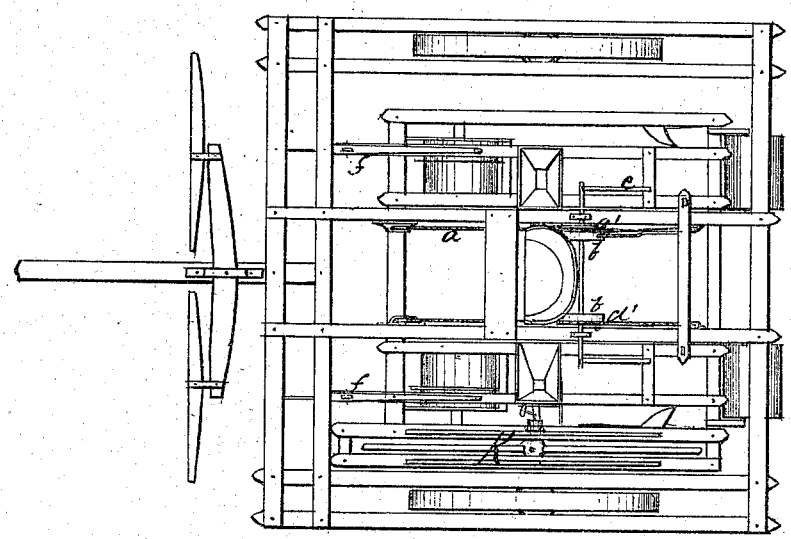
Figure 1 represents a plan view of the machine.
Figure 2:
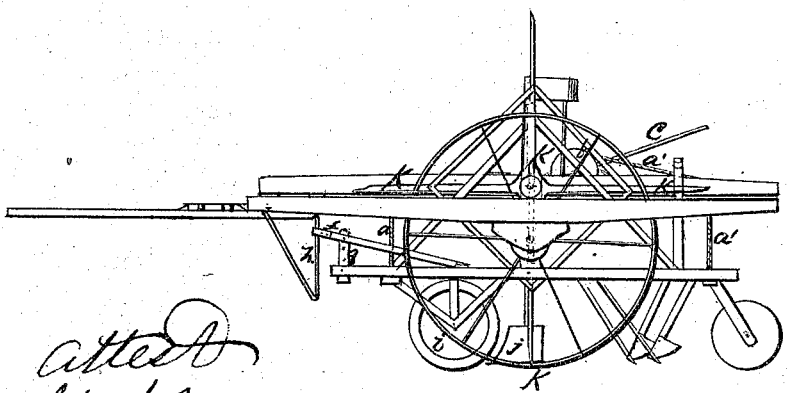
Figure 2 represents a side elevation of the machine while in the operation of marking and planting.

In the drawings, figs. 1 and 2, is shown the method of securing the planting-apparatus to the carriage. This is done by means of cords $a\ a'$, which pass over a suitable pulley.

These cords $a$ are secured at one end to the planting-apparatus, at the other to the pulley $b$. Said pulleys are provided with a lever, $c$, for the purpose of operating them. By revolving the pulley in one direction the apparatus is elevated, by revolving it in the other direction it is lowered, so as to bring the plows and rollers attached to it in contact with the ground.

Said apparatus is also attached to the carriage by means of couplings $f\ f$, which are secured to the frame-work of the apparatus, as seen in fig. 2.

Said coupling extends forward from the point of fastening to the stud $g$, to which it is also secured, and it is made adjustable at this point, as will be readily seen.

This coupling is also, at its forward end, secured to a perpendicular bar, $h$, upon which it slides freely, so as to allow the apparatus to freely adjust itself in a vertical direction. At the point at which the coupling is secured to the stud said coupling is made adjustable, so as to grade the inclination of the apparatus, as will be readily understood.

$i$ represents rollers, which are placed in front of the plows for the purpose of mashing clods, and, at the same time, these rollers are provided with a central flange or rim, which serves as a cutter, which stands exactly in range with the plow.

$j$ represents the plow, which is made in the ordinary method so as to form a furrow for the seed. Immediately following these plows are two other covering-plows, which turn a furrow in reverse directions. These plows are braced from the beam from which they are suspended, as seen in fig. 2, these braces being sharpened on their lower sides so as to form cutters for the plows.

Immediately in the rear of these plows, and in range with the seeding-plow, there is positioned another roller for the purpose of pressing the earth over the deposited seed.

The seeding-apparatus consists of two funnel-shaped boxes to contain the seed. The seed is discharged into the ground from thence by means of a reciprocating seeding-bar, which bar embraces in itself no novelty. The novelty claimed is embraced in the method of operating said bar.

$k$ represents a radial armed apparatus which is secured in suitable bearings to the seeding-apparatus. These arms are long enough to reach some little distance below the surface of the ground. These radial arms are four in number, and from the outer end of one arm to that of the other the distance is equal to the desired space between the rows of corn, or between the hills of corn. The bearings in which this device rest are secured in vertical slots, which allow the marker to rise and fall at its center, as will be understood.

Its operation is as follows:

When the seeding-frame is lowered down to the desired point, the marking-apparatus is set so that two of the arms are vertical and two horizontal, the lower end of the arm on the under side piercing the ground considerably. When a forward motion is given to the carriage a rotary motion is imparted to the marker, at the same time the bearings fall, until the next succeeding arm pierces the ground and rises to a perpendicular, carrying with it the bearings. A reciprocating motion is, from this simple device, by means of a cam-movement, imparted to the seeding-bar, and the same is caused to deposit a charge of seed every time that the marker comes to a perpendicular position. A great advantage derived from the use of this device is, that there can be no perceptible difference in the space between the rows, or between the hills. This device may be removed and a cultivator attached in its place.

What I claim as new, and desire to secure by Letters Patent, is—

The marking-apparatus $k$, having bearings working in vertical slots for the purpose of spacing off the ground for hills, the same being constructed in the manner and combined with the seeding-apparatus, as specified.

WILLIAM STIRK.

Witnesses:
H. F. MILLSON,
ALLEN ZOLLARS.